Sept. 22, 1953  C. F. FRYE  2,652,732
MACHINE CONTROL

Filed Dec. 16, 1946  7 Sheets-Sheet 2

Inventor:
Charles F. Frye
By Donald H. Sweet
Atty.

Sept. 22, 1953 C. F. FRYE 2,652,732
MACHINE CONTROL
Filed Dec. 16, 1946 7 Sheets-Sheet 3

Inventor:
Charles F. Frye
By Donald H. Sweet
Atty.

Sept. 22, 1953            C. F. FRYE            2,652,732
MACHINE CONTROL
Filed Dec. 16, 1946            7 Sheets-Sheet 4
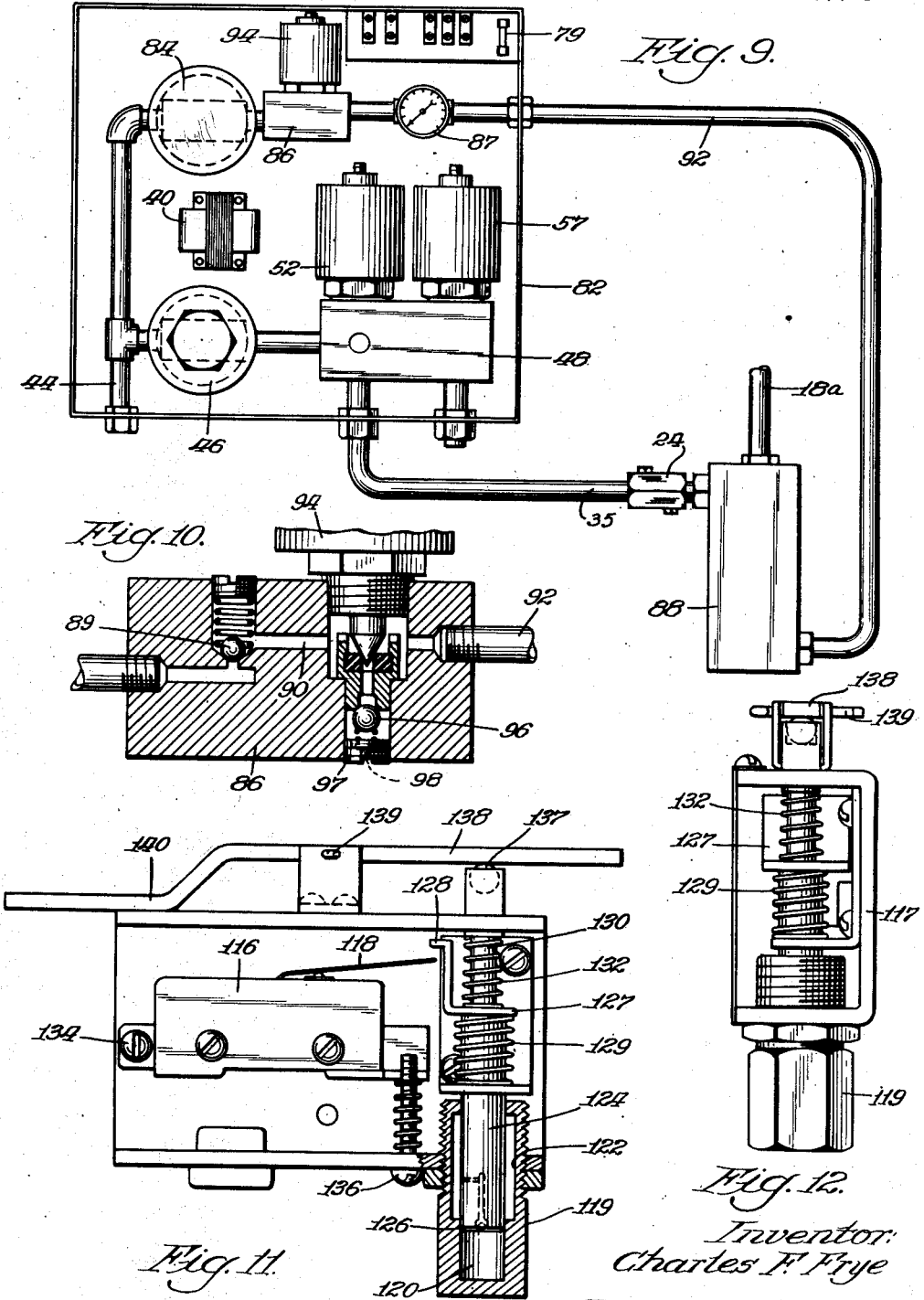
Inventor:
Charles F. Frye
By Donald H. Sweet
Atty.

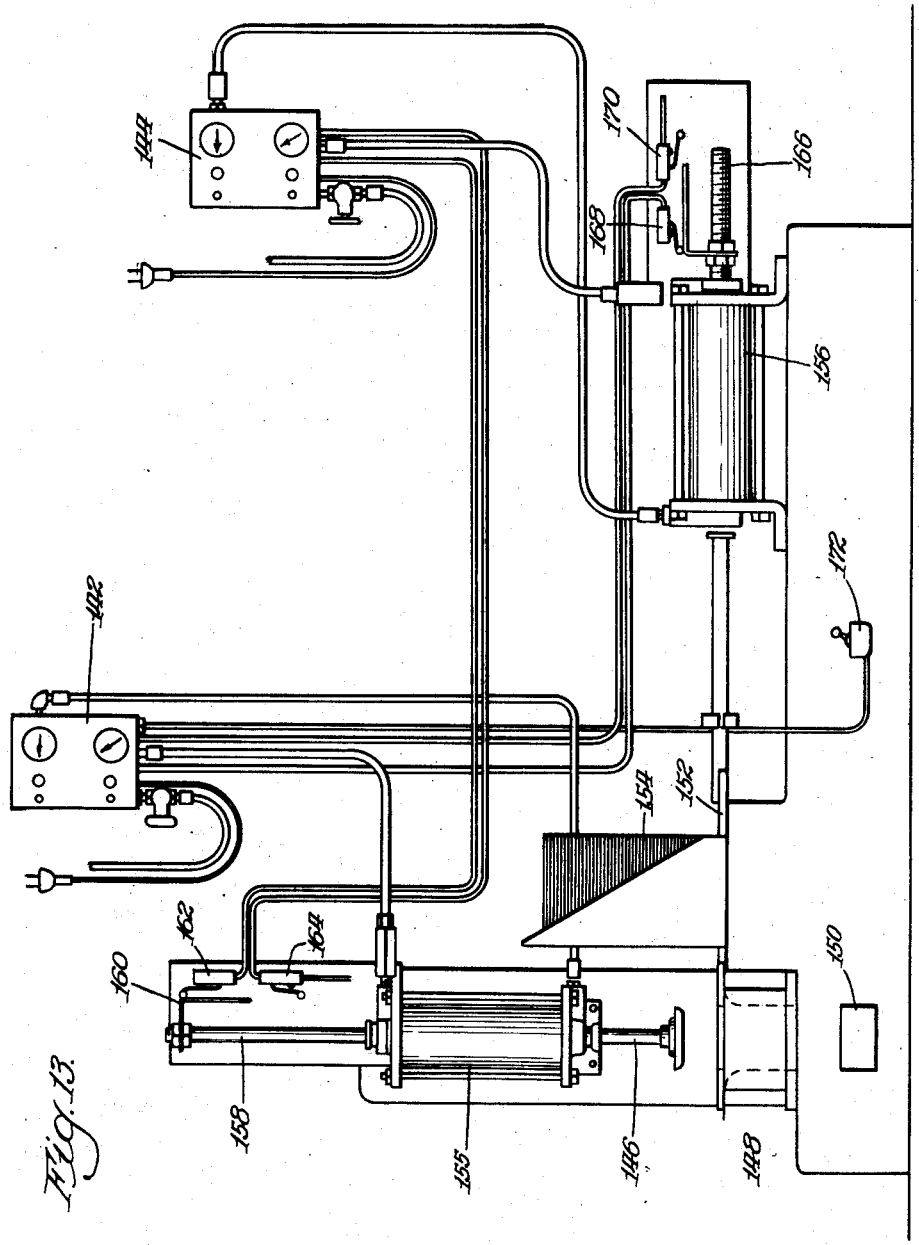

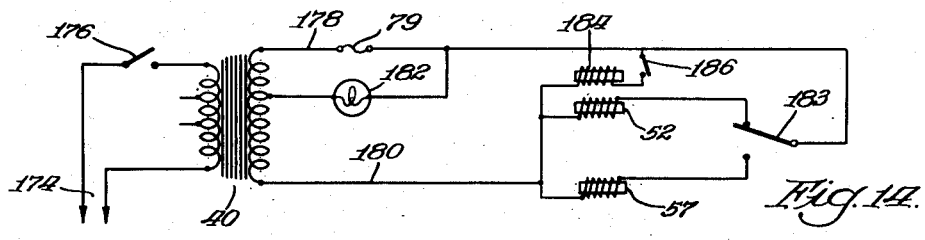
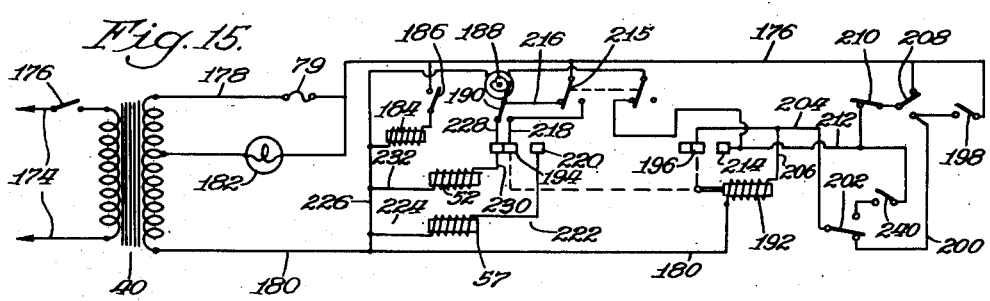
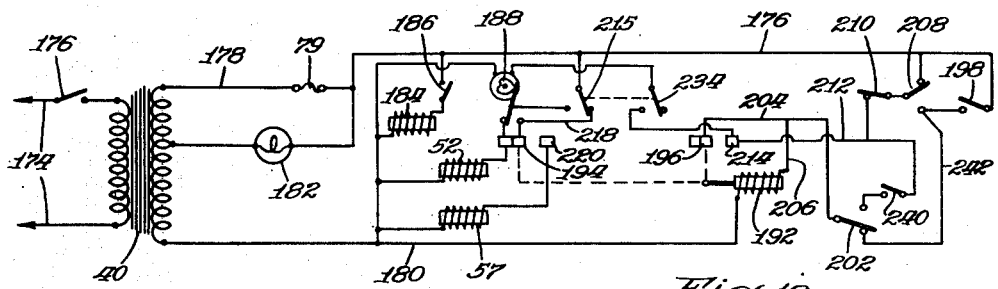
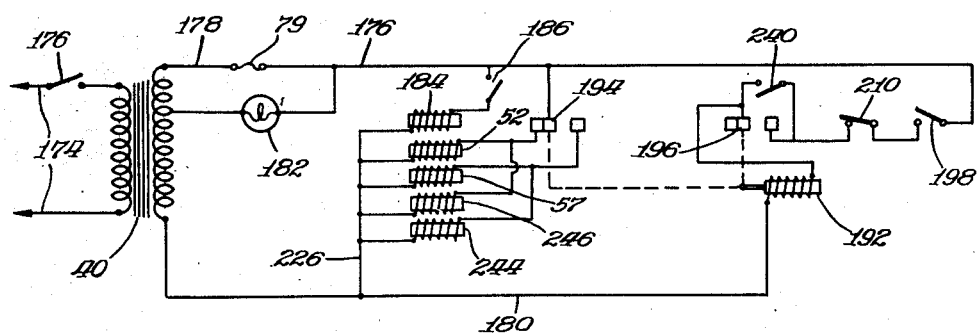

Sept. 22, 1953

C. F. FRYE 2,652,732

MACHINE CONTROL

Filed Dec. 16, 1946

Inventor:
Charles F. Frye
By Donald H. Sweet
Atty.

Patented Sept. 22, 1953

2,652,732

UNITED STATES PATENT OFFICE 2,652,732

MACHINE CONTROL

Charles F. Frye, Chicago, Ill.

Application December 16, 1946, Serial No. 716,543

5 Claims. (Cl. 77—33.5)

My invention relates to automatic controls for machinery and includes among its objects and advantages a simple type of equipment of great versatility in adaptation to a wide variety of linear motions in complicated operations; and a controllable degree of sensitivity to load, whereby many mechanical operations not otherwise susceptible to automatic control can be achieved under such control.

The use of automatic feeds in drilling, and to an only slightly lesser extent in other operations, such as planing, milling and turning, is subject to the objection that an automatic feed with a positive power drive, is not sensitive to the force required to produce the feed. Of course, it is possible to make the drive for the feed of sufficient strength and power so that the work gets done, but this compels the cutting tool to move at a constant rate of feed during certain critical periods when constant feed is undesirable. On this account a common type of multiple spindle drill has each spindle arranged for hand feed, with a clutch which the operator can throw in to give power feed after the operator has started the drill into the work. This makes it necessary for the operator to start the drilling operation by hand and then throw the clutch to shift over to power feed, but it does enable the operator to nurse the drill through the surface, or skin of relatively hard metal, by limiting the force applied and permitting the drill to hesitate a little as it works into cutting position in the body of the metal. Forcing the drill to feed at constant rate at this time results in excessive wear on the cutting edge of the drill and limits the applicability of automatic feeds.

Similarly, when it is desired to drill a blind hole to a predetermined depth, an automatic trip that throws out a feed operating at constant speed cannot be operated reliably to get a constant depth and the depth of successive holes will vary by several thousandths of an inch. With the force-sensitive timed feed according to the invention, it is possible for an inexperienced operator to drill blind holes, and the automatic features of the control will give holes of exactly identical depth with an accuracy down to precision tolerances.

With respect to these, and other practical matters involving the manual skill of an expert mechanic, equipment according to the invention is capable of a close approximation to the sensitivity of the human hand. This permits many laborious tasks hitherto considered possible only by hand operation to be performed on an automatic or semi-automatic basis.

In the accompanying drawings—

Figure 9 is a view similar to Figure 2 showing a double-pressure control box;

Figure 10 is a section through the differential relief valve of Figure 9;

Figure 11 is a side elevation of a mechanical reset timing switch;

Figure 12 is an end view of the switch of Figure 11;

Figure 13 is a diagram indicating the application of two control boxes to a timed sequence operation for a plurality of otherwise independent mechanisms;

Figure 14 is a wiring diagram for the simple manual control of Figure 1;

Figure 15 is a wiring diagram for timed deep-hole drilling;

Figure 16 illustrates the readjustment of the wiring of Figure 15 to secure repeated operation without timing;

Figure 17 is a wiring diagram for controls in which full power is available for moving the parts in both directions;

Figure 20:
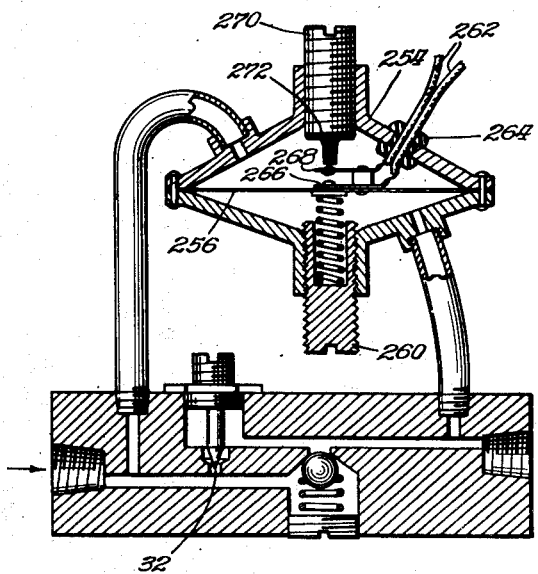

Figure 20 indicates an automatic disconnecting shunt.

Simple direct feed

Figure 1:
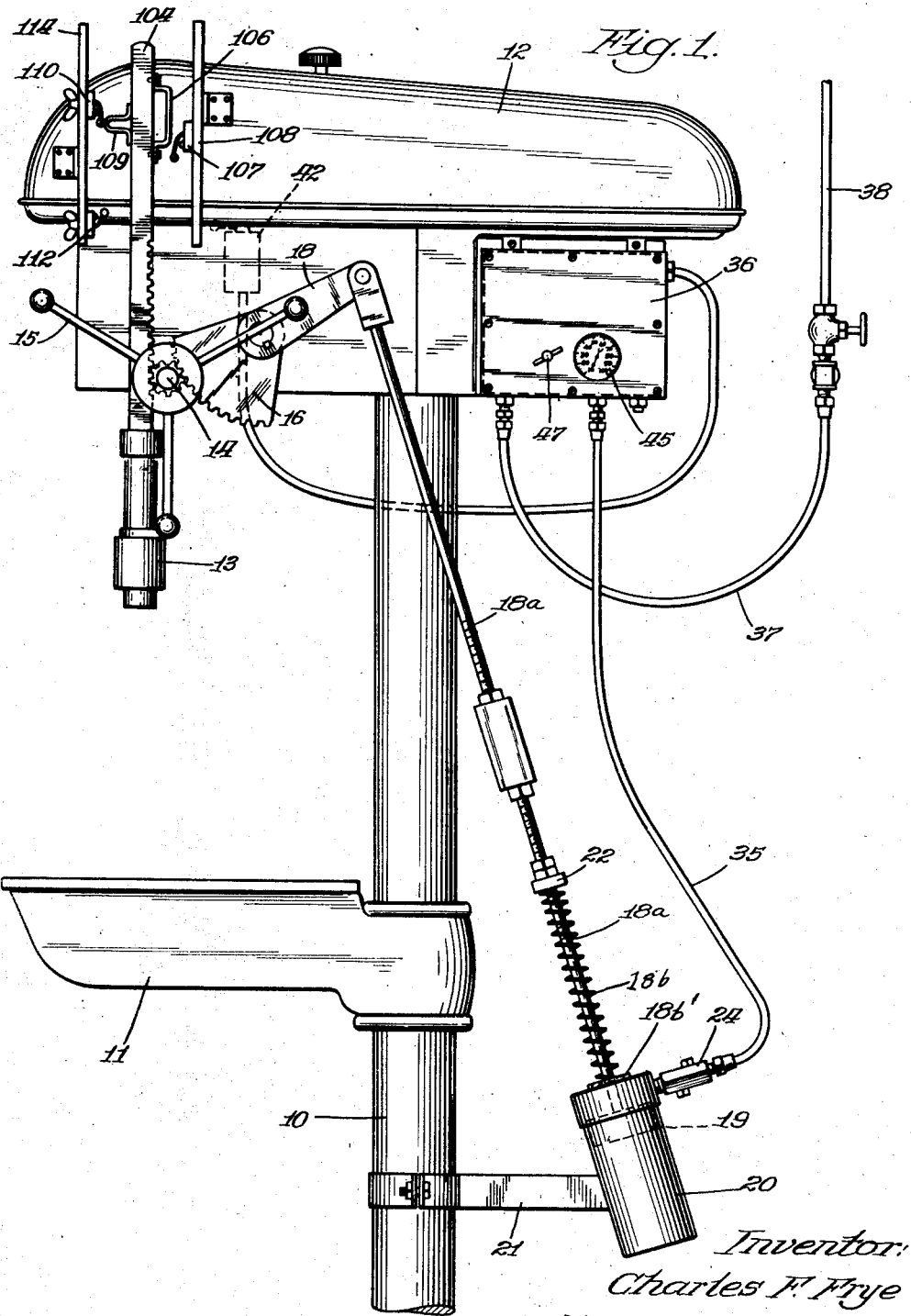
Figure 1 is a side elevation of a drill press equipped with a simple form of control according to the invention.
Figure 2:
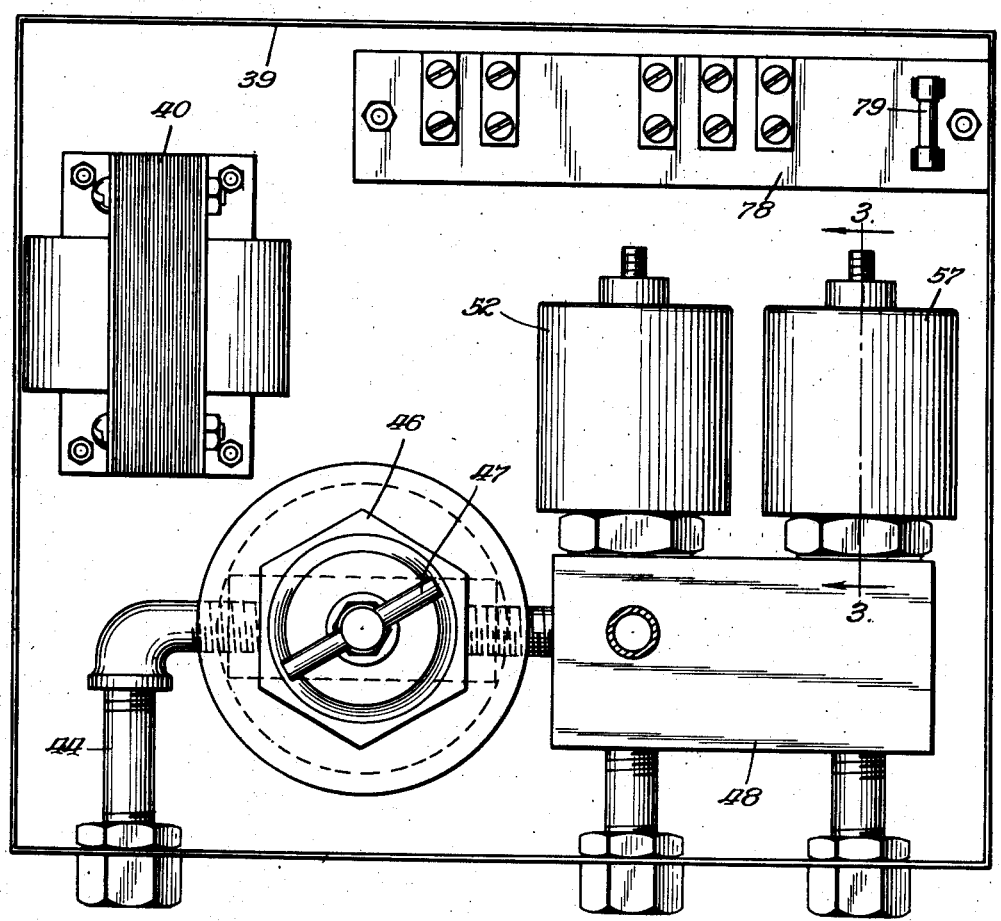
Figure 2 is an enlarged elevation of the single-pressure control box of Figure 1 with the cover removed.
Figure 3:
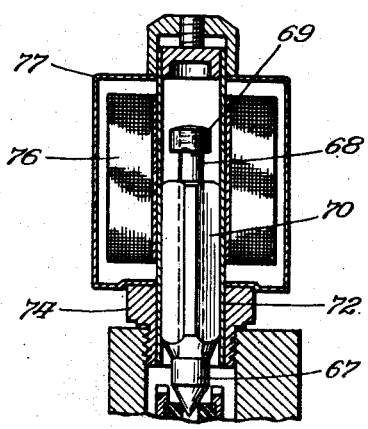
Figure 3 is a section on line 3—3 of Figure 2 showing the construction of the solenoid valve.
Figure 4:
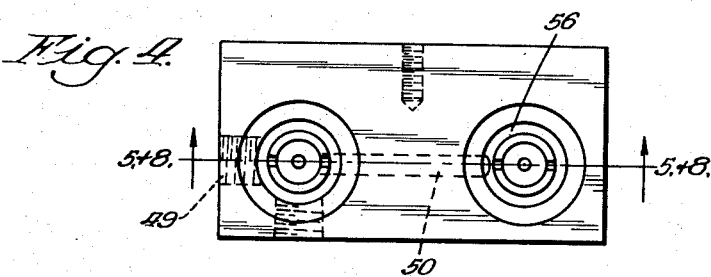
Figure 4 is a plan view of the valve block of Figure 2.
Figure 5:
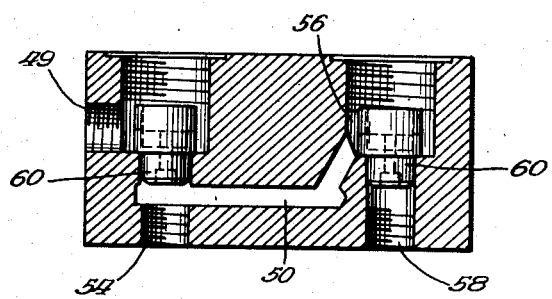
Figure 5 is a section on line 5—5 of Figure 4.

In the embodiment of the invention more particularly illustrated in Figures 1 and 2, I have indicated one of the simplest forms of equipment according to the invention. The conventional drill press includes the standard 10, work table 11, power head 12, and spindle 13, which may be reciprocated vertically by rotating the cross shaft 14 provided with three equally spaced radial handles 15 for the convenience of the operator.

This also activates the pivoted sector 16 meshing with the same pinion on shaft 14 which engages the teeth of the rack 17 to move the spindle 13. The sector 16 also carries a crank arm 18 connected by means of an adjustable pitman 18a extending down through a conventional packing 18b' to connect with the piston 19 in the cylinder 20. The cylinder may be suitably supported in any desired position as by means of a bracket 21. The pitman 18a carries an abutment 22 receiving the thrust of the compression spring 18b to hold the parts in the position shown in the drawings.

Figure 6:
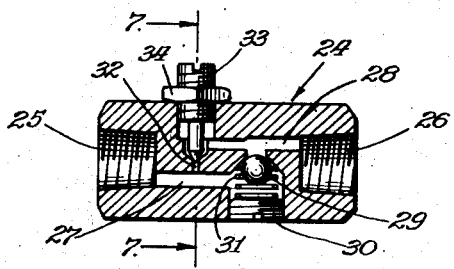
Figure 6 is a section of the quick release valve of Figure 1.
Figure 7:
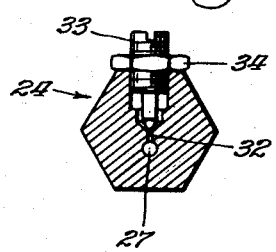
Figure 7 is a section on line 7—7 of Figure 6.
Figure 8:
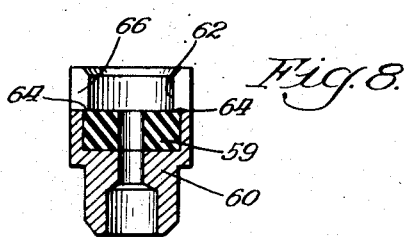
Figure 8 is an enlarged section of the valve seat on line 8—8 of Figure 4, which is the same plane as line 5—5.

Air under pressure may be introduced into the cylinder 20 to force the piston 19 down and actuate the spindle 13. As best indicated in Figure 6 the connection and relief fitting 24 comprises a hexagonal body having a pipe-threaded connection at 25 to a source of air pressure and a connection at 26 to the cylinder 20. The connection 25 is in communication with a lower passage 27 and the connection 26 with an upper passage 28. Two means of intercommunication are provided between the passages 27 and 28. The check valve ball 29, when there is no pressure in passage 27, lies at rest on the supporting plug 30 and is guided from its position of rest to the position illustrated in Figure 6 by a guide made of a coil spring 31. When pressure is suddenly delivered through the passage 27, the flow of air upward into passage 28 lifts the ball 29 into firm engagement with its seat as indicated in Figure 6. Thereafter air under pressure can only find its way to passage 28 through the other communication.

The second communication comprises the passage 32, adjustably throttled by the threaded cone-valve member 33, which may be clamped in adjusted position by a lock nut 34.

It will be apparent that when pressure is delivered to passage 27 as by means of the pipe 35, there will be a slight free discharge into passage 28 until the ball 29 has found its seat, after which the rate of delivery of power to the piston 19 will be at a slower, substantially constant rate, corresponding to the desired rate of feed for the machine tool controlled. However, because the force on the spindle depends on the air pressure in the cylinder 20, whenever the drill strikes a hard spot it can and does slow down or hesitate in its progress. Thus the piston and cylinder effect a resilient lost-motion connection between the power source and the feed mechanism for advancing the tool. By automatically limiting the maximum pressure available in the supply pipe 35, to a value corresponding to a feeding force that the drill can stand without injury, it is possible to have automatic feed without breakages and without requiring the operator to nurse the drill point into the work before the feed is made automatic.

Simple return stroke

It will be apparent that when the pressure supply in pipe 35 fails, as by connecting that pipe to atmosphere, the contents of the cylinder 20 can escape at a very rapid rate, finding its exit through passage 28 and down around the ball 29 with extreme freedom, so that the spring 18b can return the parts to the position shown in Figure 1.

Simple control panel

In Figures 2 to 5, inclusive, I have indicated the significant details of a simple standard control panel, illustrated at 36 in Figure 1 as connected by a pipe 37 to a source of air pressure 38.

Referring to Figure 2, the casing 39 houses a step-down transformer 40 to which a 120 volt alternating current may be delivered subject to the control of a manual master switch 42 (see Figure 1).

Air under pressure is received through the connector 44 and conveyed to a conventional pressure reducing valve 46, the adjusting handle 47 of which projects through the cover of the housing 39 to be accessible to the operator. From the pressure reducing valve the air at reduced pressure enters the control block 48 at the inlet 49. The gauge 45 is provided for the convenience of the operator in knowing what pressure he is getting. From the inlet 49 the air may find its way to the horizontal passage 50 subject to control by a first solenoid valve 52. The passageway 50 always connects at 54 to the actuating cylinder and to the chamber 56 controlled by the right solenoid valve 57. It will be apparent that with the left solenoid valve 52 open and the right closed, operating pressure will be delivered to the cylinder subject to the throttle valve 32. But if the relationship is reversed, the passageway 50 no longer receives air under pressure, being cut off from the inlet 49, and functions as a discharge passage through the chamber 56 and exhaust opening 58. The insulating panel 78 carries a fuse 79 and terminals 80 for the low voltage wiring connections.

The solenoid valve

Each of the valves 52 and 57 includes a rubber seat 59, which may be assembled in the holder 60 by pushing it down mechanically through the discharge opening 62 until it seats below the downwardly facing shoulder, 64. The holder 60 may be threaded into the block 48, and is notched at 66 to improve the cross sectional area of the opening available when the cone valve 67 is lifted. Each cone valve member is non-magnetic and comprises a conventional head and a shank 68 provided with an enlargement 69 at its upper end. The magnetic hammer element 70 has lost motion connection by reason of sliding movement on the shank 68. The hammer 70 is guided in the tube 72 which is brazed into the supporting nut 74. The winding 76 is preferably enclosed in a housing 77. It will be apparent that when the winding is energized, the hammer 70 will rise rapidly and acquire considerable speed before it hits the shoulder 69 so that the valve head will be lifted instantaneously. The downward movement will also acquire a fair amount of speed before the valve closes, but this is less important because the pressure difference at the time the valve closes is very small. The combination of the rubber seat and the extremely quick opening reduces erosion by air flow at the point of closure to a minimum and secures a construction of very long service life.

Double pressure control

Referring now to Figures 9 and 10, it is possible to secure greater flexibility in cushioning and return movement by employing pneumatic pressure on both ends of the actuating piston. The box 82 may house the identical pressure reducing valve 46 and distributing block 48 and solenoids 52 and 57 illustrated in Figure 2, as well as the step-down transformer 40. In place of the spring 18b I provide a second independent pressure-reducing valve 84 discharging to the control block 86 with an additional pressure gauge 87 connected to show the pressure in the cylinder 88 below the piston. The air delivered to the block 86 finds its way first through a simple lightly held check valve 89 into the passage 90, which communicates with the pipe 92 leading to the lower end of the cylinder 88. Communication between the passage 90 and atmosphere is controlled by two valves arranged in series. The first valve 94 is a duplicate of the solenoid control valves 52 and 57 but the lower end of the holder 60 forms a seat for a spring-held relief valve 96 adjustably tensioned against its seat by the adjusting nut 97 provided with air vent 98. With the valve 94 open, the pressure on top of the piston can move the piston down and the contents of the cylinder below the piston can escape through the valve 96, which is set to operate at a pressure slightly higher than that delivered by the reducing valve 84. Therefore the valve 94 is held up by energizing its solenoid during the working operation. But where the resistance to the feeding movement decreases rapidly as the machining operation nears a close (as in the case of drilling a hole or milling a slot) the force applied to the feed can be reduced at the critical point by letting the valve 94 fall shut as the tool begins to break out of the work.

Figure 19:
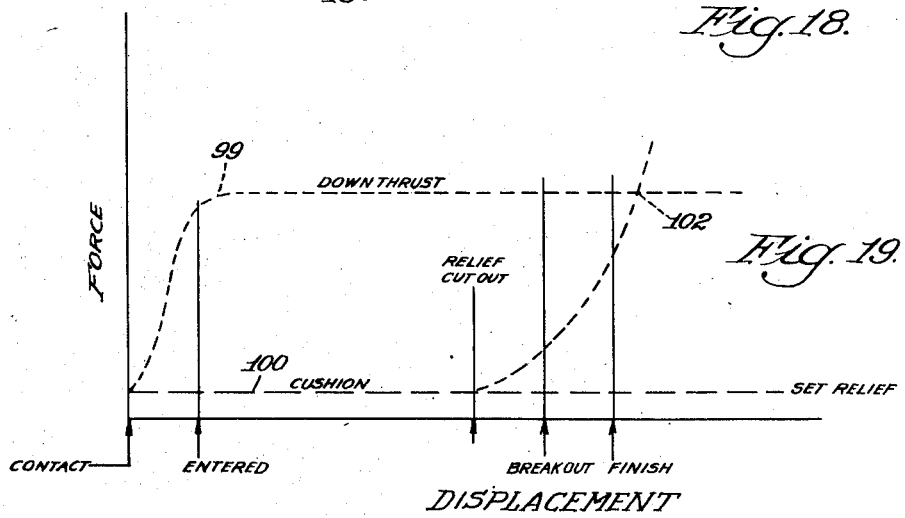
Figure 19 is a force diagram for ordinary drilling.

This makes it possible to secure operation substantially according to Figure 19 in which the dotted line 99 indicates the effective down thrust on the top of the piston and the dash line 100 indicates the effective resistance of the air below the piston. Upon reference to Figure 19 it will be noted that at the initial contact between the tool and work, the force on top of the piston is not appreciably greater than that below it, but the contact between the tool and the work resists the feeding movement and permits the throttle 32 to let the pressure build up gradually as the tool enters the work, to a maximum which will be maintained until the work is finished. It will also be noted that the dash line 100 will begin to curve upward sharply at the point indicated as "relief cutout" on the drawing and the resistance of the air below the piston will increase at an increasingly rapid rate thereafter. Thus when the tool begins to break out of the work the effective force on the piston has already been reduced a little and by the time it finishes breaking out of the work, the force may be reduced to a very minor fraction of its maximum value. In fact, after the tool has moved a short distance beyond the finishing position, the cushioning action equals the down thrust at 102 and there will be no tendency for the tool to lurch forward violently to the limit of its movement.

Suitable electric contacts may be positioned along the path of movement of the tool to enable the operator to adjust the operation to suit the work. Thus in Figure 1 I have diagrammatically indicated an extension 104 on the spindle 13, provided with a bridge 106 on one side adapted to operate a switch 107 for controlling the value 94. The length of the bridge determines the distance through which the valve 94 will be held open and the switch may be mounted for vertical adjustment on a slide 108 to secure precise timing of the relief cutout point shown in Figure 19. The other side of the extension may carry a projection 109 to contact a switch 110 at the top of the path of movement and condition solenoids 52 and 57 for the down stroke, and to contact a switch 112 to condition the same solenoids for the return stroke at substantially the point 102 of Figure 19. Switches 110 and 112 may be adjustly mounted on a single slide 114.

Timed dwell

Referring now to Figures 11 and 12 I have indicated a microswitch 116 housed in a suitable channel-shaped support 117 and operated to open and close a circuit by pressure on the finger 118. To actuate the finger I provide a timing mechanism involving an oil filled dash-pot 119 having a working space 120 and an enlarged bore 122 above the working space. The plunger 124 is a loose fit in the working space 120 and is provided with a vent passage including a check valve 126 which permits liquid to flow into the working chamber but not out of it. The upper end of the plunger carries a bracket 127 having a projection 128 overlying the end of the finger 118 to depress the same. The plunger and bracket are held up in the position of Figure 11 by a compression spring 129. The push rod 130 telescopes freely in the plunger 124 and carries an abutment for the upper end of the compression spring 132, the lower end of which bears on the upper end of the plunger 124.

It will be apparent that if the push rod 130 is forced down, the increased tension of the spring 132 will result in an unbalanced force to move the plunger 124 down, but this movement will be damped by the liquid in the working space, which has to leak up around the sides of the plunger. Thus it is easy to design the parts so that a period of from two to as much as fifteen seconds elapses before the projection 128 has moved down to the limit of its movement. By pivoting the microswitch at 134 and adjusting its position with the adjusting screw 136 the position of the finger 118 may be shifted to secure any desired delay within the capacity of the device.

Means are provided for depressing the plunger 130 when the tool comes to the end of its desired path of movement. I have indicated a ball contact 137 at the upper end of the push rod 130 and a rocking lever 138 pivoted at 139. The rocking lever may be positioned where a suitable projection from a spindle or tool carriage will engage it, and is of sufficient mechanical strength to hold the spindle against movement under the force of the actuating piston. I have indicated a heel 140 to limit the movement of the lever 138 in the other direction. By extending the heel 140 at 141 convenient mechanical contact is provided for machine elements moving in either direction.

When it is desired to feed any tool, such as a drill, end broach or milling cutter, so that it will cut into the work up to a predetermined point with a high degree of precision, the equipment of Figures 11 and 12 may be employed in such a way that the tool carriage moves with a high degree of precision to a predetermined position and remains in that predetermined position for a predetermined time, which may amount to several seconds, while the cutting tool continues to turn against the work and load distortions of the frame of the machine are relieved. Then when the microswitch is closed and the tool backs away it will be found that the bottom of the hole or the end of the cut has been finished with precision. With such equipment it is not difficult to drill blind holes automatically and have all the holes of the same depth within one-half of one thousandth of an inch, and with a little greater degree of care somewhat higher precision is obtainable.

It will be apparent that because the feeding instrumentality is force-sensitive and hesitates momentarily and only exerts a predetermined maximum feeding force, no harm is done if the

Unit correlation

In Figure 13 I have indicated a combination of two control boxes 142 and 144 to correlate and synchronize the operation of a plunger 146 for forcing a blank through a die 148 to deliver a formed box 150, and a slide 152 for feeding a blank from a pile 154 into position to be operated on by the plunger 146. The plunger is actuated by the piston 155 and the slide by the piston 156. The plunger carries an extension 158 with a contact arm 160 to engage the control switch 162 at the top of the stroke and the control switch 164 at the bottom of its stroke. Similarly, the slide carries an extension 166 to actuate a switch 168 at the forward end of its stroke and the switch 170 at the rear. Subject to the delivery of energy to the master switch 172, the plunger 146, at the bottom of its stroke completes a circuit in the control box 144 to start the plunger 156 forward. But the initial forward movement operates the switch 170 to lift the plunger 146 so that it will be out of the way before the slide 152 begins to move a new blank into position. And as soon as the slide 152 has the new blank in position it operates the switch 168 to start the plunger 146 down. But the initial movement of plunger 146 operates the switch 162 to start the slide 152 back to its initial position, where it will remain until the plunger 146 finishes its work and again actuates the switch 164 to start a new cycle. Thus the full equivalent of a completely automatic special-purpose machine can be secured by adding simple stock controls to old machines heretofore operated by hand or by cams, with or without storage of partly finished parts between successive operations. Also readjustments to change the size operated on or even the sequence of operations may be made on the spot without redesigning complicated automatic transmissions.

Wiring for single direction manual controlled operation

Referring to Figure 14, the step-down transformer 40 may receive full line voltage from the power lines 174 subject to the control of a master switch 176. I prefer to reduce the voltage to a point where insulation for wiring that may come in contact with metallic machine parts need not be of abnormally high durability or breakdown resistance and where the tendency to arc on the switch contacts is greatly reduced. I have found that with the voltage as high as 24 volts ordinary switches can operate to make and break a circuit 15,000,000 times or so without deterioration, and that a short circuit will blow a simple fuse without injuring anything. Also, such a voltage is harmless if the operator should happen to expose himself to it.

The low voltage side of the transformer delivers current to lines 178 and 180, one of which includes the safety fuse 79. I connect a signal light 182 past the fuse 79 and across a minor fraction of the low voltage winding so that the light will burn low as long as the fuse is in good condition. When the fuse is out the lamp burns more brightly but does not pass enough current to maintain an arc or to operate the power elements beyond. But the operator can hunt for a short circuit by manipulating the parts, and when he finds it the light will tell him.

For simple manual control I provide a control switch 183 which delivers current in one position to the power solenoid 52 so that its valve will be open while the exhaust solenoid 57 remains inactive. When the operator moves the switch 183 back to the position of Figure 14 the power solenoid is no longer energized and its valve closes while the exhaust solenoid connects the pipe 35 to the atmosphere and the tool returns to initial position. To add the automatic cushioning action described in connection with Figure 19 it is only necessary to use the control box of Figure 9 and wire the solenoid 184 for the valve 94 through a contact switch 186 closed by the tool carriage at the proper point.

Deep hole drilling

Referring now to Figure 15 I have indicated a slowly rotating cam 188 adapted to oscillate a switch 190 into either of two positions. I provide an additional solenoid 192 adapted to move a double throw switch, including contacts 194 and 196 from the position indicated in Figure 15 to the right against the other set of stationary contacts. To start the operation the operator momentarily closes a push button switch 198 establishing a circuit through conductor 200, switch 202, conductor 204 to the contact 196 and conductor 206 to the solenoid 192 and through the solenoid to the return line 180. This moves the contacts 194 and 196 to the right.

Movement of the contact 196 to the right completes a holding circuit for the solenoid 192 as follows: from line 178 through switches 208 and 210 and conductor 212 to the stationary contact 214. From and through contact 196 and conductors 204 and 206 through the winding 192 to the other line 180. Movement of switch 190 to the right also completes a circuit through the power solenoid 57 as follows: from line 178 through conductor 216 to the finger 190 then through conductor 218 to the contact 194; then through stationary contact 220 through conductor 222, solenoid 57 and conductor 224 to the cross connection 226 and to the other line 180. Subsequent return of the finger 190 to the position of Figure 15 will break this power circuit and establish the exhaust circuit as follows: from line 178 through switch 215, conductor 216, finger 190 and conductors 228 and 230 through the exhaust solenoid 52 and conductor 232 to the cross connection 226 and the line 180. Thus, as long as the operator does not do anything to change the sequence of operations, the drill will be applied with the desired predetermined force for a predetermined time and then lifted out of the hole to clear pieces and cool itself for a different predetermined time and this sequence of operations will continue indefinitely until the hole is drilled.

The sequence of operations which is described may advantageously be supplemented, if desired, by providing a cushioning solenoid 184 controlled by a contact switch 186 which will be operated, in case of a through hole, when the drill finally works its way through after an indeterminate number of successive undulations.

Single cycle

To change the wiring to a single cycle operation, the switch 215 and its mechanically connected companion switch 234 are shifted to the right. This renders the automatic timing device 188 inoperative and operation thereafter is as follows:

Normal momentary closure of the foot switch 198 completes the same initial circuit for solenoid 192 as in Figure 15. But the holding circuit is from line 176 through switches 208 and 210, conductor 212, contact 214 and conductor 204 and 206 through the winding 192 to line 180. Movement of contact 194 to the right completes the power circuit as follows: line 176, switch 215, line 218, contacts 194 and 220 through solenoid 57 to line 180. The tool now moves down through its entire working stroke. When it reaches the bottom, mechanical contact opens the switch 210, which opens the holding circuit through solenoid 192 and contacts 194 and 196 go back to the left again with power solenoid 57 deprived of power and contact 194 delivering to the exhaust winding 52. This brings the spindle back up and at the top of the stroke the spindle comes to rest and nothing more will happen until the operator starts another cycle.

Automatic repeated cycle

To change to automatic repeated cycle operation, switch 202 is moved up and switch 208 is moved down. Then it is necessary for the operator to keep his foot continuously on switch 198 to secure continuous automatic cycle operation. The initial start is by closing switch 240 momentarily, which completes a circuit as follows: from line 176 through switches 198, 208, 210, conductor 212, switch 240, switch 202, conductors 204 and 206 and winding 192 to line 180. Thereupon contacts 194 and 196 move to the right and contact 196 completes a holding circuit as follows: line 176, switches 198, 208, 210, conductor 212, contacts 214 and 196, conductors 204 and 206, through winding 192 to line 180. The power solenoid 57 is supplied with power by contact 194 as in single cycle operation until the bottom of the stroke is reached when switch 210 is mechanically opened and solenoid 192 is de-energized and the contacts move back to the position of Figure 16 and the spindle comes up again. At the top of the stroke switch 240 is momentarily closed by the spindle and solenoid 192 again receives energy and completes its own holding circuit and a complete cycle takes place over and over again as long as the operator keeps his foot on switch 198.

In both the single cycle and automatic repeated cycle operations the end of the down stroke may be cushioned as before by means of solenoid 184 and position switch 186.

Straight operator control

By a simple change of one switch from the single cycle adjustment the same wiring can function without any automatic action as follows: switch 208 is moved to neutral position. Now closure of switch 198 by the operator at the machine completes a circuit through solenoid 192 as follows: from line 176 through switch 198, conductor 242, switch 202, conductors 204 and 206, winding 192 to line 180. This moves the contacts to the right and the power solenoid is energized and the exhaust solenoid de-energized and the tool goes to work. When the operator opens switch 198 the circuit through solenoid 192 is broken and the parts go back to the position of Figure 16 and the tool goes back up.

Power return

Referring now to Figure 17 any one of the arrangements of Figures 15 and 16 previously discussed may be adapted for power return of the tool by merely using two sets of solenoids 52 and 57 with their valve block 48, and connecting the second set to the bottom of the cylinder 20 to take the place of the spring 23. In Figure 17 I have indicated the commonest arrangement for operation in this way, omitting non-essential portions of Figures 15 and 16. Closure of the foot switch 198 establishes a circuit from line 176 through switches 198 and 210 and at the top of the stroke switch 240 is momentarily closed mechanically, which delivers current to the winding 192 and line 180. Contacts 194 and 196 move to the right for the down stroke and at the end of the down stroke the mechanical opening of the switch 210 will let the parts move back to the position of Figure 17 until the return of the tool to the top of the stroke momentarily closes switch 240 again and starts the next cycle. To deliver power to both ends of the cylinder it is only necessary to add the exhaust solenoid 244 for the bottom of the cylinder, connected in parallel with the power solenoid 57, and the power solenoid 246 for the bottom of the cylinder, connected in parallel with the exhaust solenoid 52 for the top of the cylinder. The cushioning by means of solenoid 184 and switch 186 functions just as before.

Figure 18:
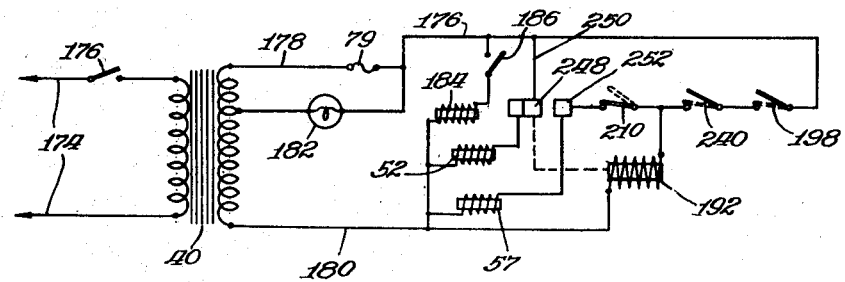
Figure 18 is a wiring diagram employing a single pole switch.

Single pole automatic

Where less adaptability to operate in a plurality of different ways is required, the simplified wiring of Figure 18 will secure automatic repeated cycle operation as easily as the more complete wiring. Referring to Figure 18, closure of foot switch 198 at a time when the tool is at the top and switch 240 is momentarily closed, will complete a circuit from line 176 through switches 198 and 240 and line 180, which moves the single contact 248 to the right and completes a holding circuit through line 176, conductor 250, contacts 248 and 252, switch 210 and winding 192 to line 180. The power solenoid 57 is now energized and the exhaust solenoid 52 de-energized and the tool moves down. At the end of the feed stroke switch 210 is momentarily opened, which de-energizes solenoid 192 and the parts move back to the position of 192 with the power solenoid de-energized and the exhaust solenoid energized and the tool comes back up. Cushioning solenoid 184 and position switch 186 function as before.

In Figure 20 I have indicated a chamber 254 containing a pressure sensitive diaphragm 256. The chamber is connected in shunt around the throttle 32 with the pressure on the high pressure side of the throttle coming in on top of the diaphragm 256 and the pressure on the low pressure side of the throttle below the diaphragm. The diaphragm may be biased by compression spring 258, which may be adjusted by the set screw 260. I have indicated conventional circuit-closing connections in the nature of a two-conductor cable 262 connected through the insulating bushing 264 to contacts 266 and 268, with an adjustable contact screw 270 carrying an insulating button 272 overlying the contact 268. It will be apparent that the adjustment screws 260 and 270 can be adjusted so that the diaphragm will complete a circuit at a predetermined pressure difference across the throttle 32. By adjusting the parts so that this circuit is closed when pressure becomes practically zero, it is possible to arrange any of these automatic controls so that if anything happens to stop the feed of the tool, a few seconds after the feed stops the pressure across throttle 32 is equalized and the whole machine is shut down until the operator comes to remedy the difficulty.

It will be apparent that any number of otherwise independent mechanisms can be correlated in any sequence of operations and that by the conjoint use of the slow and gentle action of the throttle-fed pneumatic piston and the timed delay in the closure of any circuit by means of the equipment of Figures 11 and 12, any sequence of operations can be made automatic on such a basis that if any of the individual operations is interrupted or delayed, the succeeding operations will wait for it automatically. Thus, in the use of a continuous kiln or leer we might have a following sequence of operations:

(1) Open the inlet door; (2) insert the material; (3) close the inlet door; (4) turn on steam; (5) turn off and exhaust steam; (6) open an outlet door; (7) remove the material through the outlet door; (8) close the outlet door; (1) open the inlet door at the beginning of the next cycle. It will also be obvious that the gentle pneumatic operation would be equally advantageous in case such a series of operations were to be timed by means of a number of cams on a rotating shaft, but in that case failure of one step might result in premature performance of the next step, with attendant damage.

For instance, in feeding work pieces on a rotary carrier member to and from a machining tool, the interruption of the movement of the rotary member with high precision in each successive position is a very difficult mechanical problem. According to this invention, such a rotary member can be replaced by a simple slide that moves to and fro between fixed stops which, because they are permanently stationary, can function with high precision. The slide moves to one end of its path and while a machine operation is performed on one end of the slide the other end projects for removal of the finished piece and reloading by the operator and then the slide moves to the other end of its path, and so on indefinitely.

Others may readily adapt the invention for use under various conditions of service by employing one or more of the novel features involved, or equivalents thereof. As at present advised with respect to the apparent scope of my invention I desire to claim the following subject matter.

I claim:

1. In a pneumatic machine control, in combination: a pneumatic cylinder; connections between said cylinder and the feed mechanism of a machine tool for actuating said feed mechanism; said cylinder having an inlet; a fitting adjacent said inlet; two passages through said fitting communicating with said cylinder; one of said passages including adjustable throttling means continuously operative; the other of said passages containing a check valve preventing flow into said cylinder; said check valve being normally open and adapted to admit a predetermined small quantity of fluid quickly before the inflowing fluid closes said valve; a supply conduit communicating with both passages; and means for connecting said supply conduit to atmosphere or to a source of fluid under pressure.

2. In a pneumatic machine control, in combination: a pneumatic cylinder; connections between said cylinder and the feed mechanism of a machine tool for actuating said feed mechanism; two passages to said cylinder, one of said passages including adjustable throttling means continuously operative; the other of said passages containing a check valve preventing flow into said cylinder; said check valve being normally open and adapted to admit a predetermined small quantity of fluid before the inflowing fluid closes said valve; a supply conduit communicating with both passages; and valve means for connecting said supply conduit to atmosphere or to a source of fluid under pressure.

3. In a pneumatic machine control, in combination: a pneumatic cylinder; connections between said cylinder and the feed mechanism of a machine tool for actuating said feed mechanism; two passages to said cylinder, one of said passages including adjustable throttling means continuously operative; the other of said passages containing a check valve preventing the flow into said cylinder; said check valve being normally open and adapted to admit a predetermined small quantity of fluid at high velocity before the inflowing fluid closes said valve; a supply conduit communicating with both passages; valve means for connecting said supply conduit to atmosphere or to a source of fluid under a predetermined pressure; and means for adjusting said predetermined pressure to various values.

4. In a pneumatic control system for machine tools, in combination: a fitting having a through passage; a first check valve in said passage permitting flow in one direction only; a lateral passage communicating with said through passage and with atmosphere; an externally controlled valve in said lateral passage adapted to open and close said lateral passage; and a spring-held adjustable check valve in said lateral passage between said externally controlled valve and atmosphere, constructed and arranged to prevent flow into said passage but to permit flow out of said passage at pressures above a predetermined pressure.

5. In a pneumatic control system for machine tools in combination: a fitting having a through passage; a pressure source connected to one end of said passage; a check valve in said passage permitting flow away from said source only; a lateral passage communicating with said through passage beyond said check valve, and with atmosphere; a control valve in said lateral passage adapted to open and close said lateral passage; and a spring-held adjustable check valve in said lateral passage between said control valve and atmosphere, constructed and arranged to prevent flow into said passage but to permit flow out of said passage at pressures above a predetermined pressure only.

CHARLES F. FRYE.

References Cited in the file of this patent

UNITED STATES PATENTS

| Number | Name | Date |
|---|---|---|
| 1,069,995 | Anderson | Aug. 12, 1913 |
| 1,850,457 | Hughes | Mar. 22, 1932 |
| 1,924,594 | Blood et al. | Aug. 29, 1933 |
| 1,937,173 | Taylor | Nov. 28, 1933 |
| 1,998,873 | Kingsbury | Apr. 23, 1935 |
| 2,037,062 | Brach | Apr. 14, 1936 |
| 2,079,640 | Vickers | May 11, 1937 |
| 2,093,200 | Libke | Sept. 14, 1937 |
| 2,241,747 | Shaw | May 13, 1941 |
| 2,328,721 | Irregang | Sept. 7, 1943 |
| 2,336,478 | Goldberg | Dec. 14, 1943 |
| 2,418,220 | Churchill | Apr. 1, 1947 |
| 2,472,967 | Goldberg | June 14, 1949 |
| 2,472,968 | Goldberg | June 14, 1949 |